(No Model.)
H. H. FRANKS.
Gate.
No. 227,161. Patented May 4, 1880.
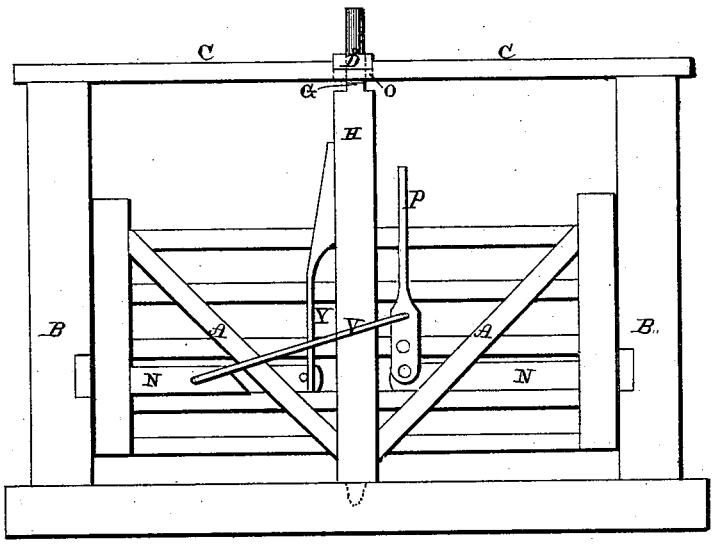
Fig. 1.
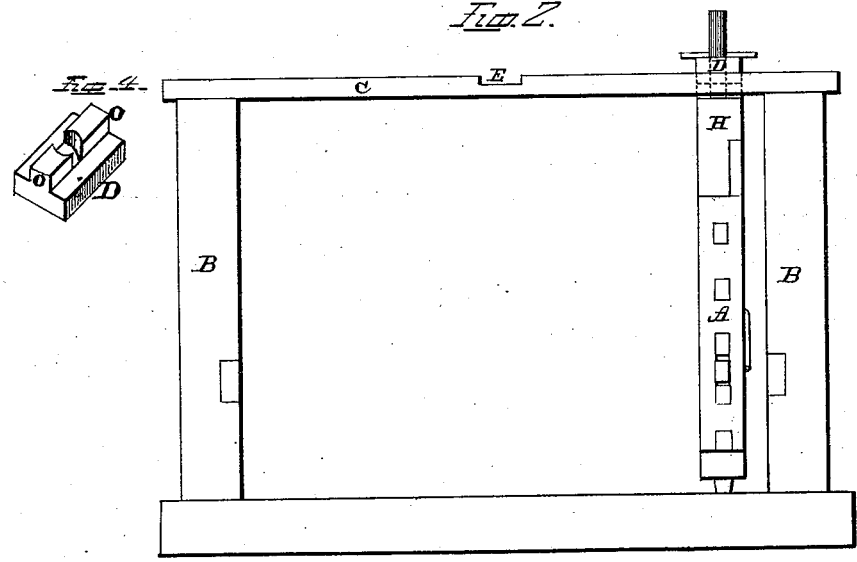
Fig. 2.
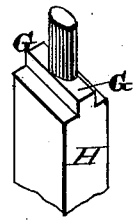
Fig. 5.
Fig. 4.
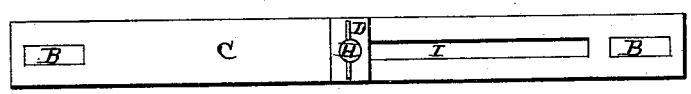
Fig. 3.
Witnesses
Will. W. Mortimer.
Chas. H. Isham
Inventor
H. H. Franks
per
F. A. Lehmann
atty

UNITED STATES PATENT OFFICE.

HENRY H. FRANKS, OF BROWNSVILLE, MISSOURI.

GATE.

SPECIFICATION forming part of Letters Patent No. 227,161, dated May 4, 1880.

Application filed March 11, 1880. (No model.)

*To all whom it may concern:*

Be it known that I, HENRY H. FRANKS, of Brownsville, in the county of Saline and State of Missouri, have invented certain new and useful Improvements in Gates; and I do hereby declare the following to be a full, clear, and exact description of the invention, such as will enable others skilled in the art to which it pertains to make and use it, reference being had to the accompanying drawings, which form part of this specification.

My invention relates to an improvement in gates; and it consists in the combination of a gate which is pivoted at its center, so as to open and close at both ends, the upper end of the pivotal post of the gate being provided with a tenon which catches in the slot in the cross-timber above it when the gate is raised off its lower pivot to be moved sidewise, and which tenon prevents the gate from flying around while it is moved to one side of its frame to leave the roadway clear.

It further consists of a flanged block, through which the upper end of the pivotal post passes, and which block catches in a recess made in the top of the center of the slotted cross-timber, so as to prevent the gate from being moved sidewise until the block has been raised out of its recess, as will be more fully described hereinafter.

In the drawings, Figure 1 is a side elevation of my invention, showing the gate closed. Fig. 2 is a similar view, showing the gate moved over to one side of the gateway. Fig. 3 is a plan view of the top of the frame, showing the slot in which the gate moves. Fig. 4 is an inverted perspective of the pivotal block. Fig. 5 is a perspective of the top of the pivotal post.

A represents a gate, which is pivoted at its center, at both top and bottom, so as to open and close in both directions; B, the two posts upon which the ends of the gate latch when closed, and C the cross-timber which unites the upper end of the two posts together. The lower pivot of the gate is formed in the center of the roadway, while the upper one is formed in the block D, which is held in position by means of the recess E, cut in the top of the cross-timber C. As long as this block is held in this recess and the lower pivot is in position the gate can be turned freely around upon its two pivots, so as to open and close at each end, but has no other movement. When, however, it is desired to open the gate in such a manner as to leave the whole of the roadway clear, the gate is raised upward from its lower bearing, thereby lifting the block D up out of the recess in which it has been held. This lifting motion can only take place when the gate stands at right angles to the frame, or wide open, and when the tenon G upon the top of the central post, H, of the gate is in a line with the slot in the cross-beam C. This tenon G serves the double purpose of preventing the gate from being raised upward until after the gate has been opened wide, and when it has been raised this tenon catches in the slot, so as to prevent the gate from turning around in either direction. If this tenon were not used, after the gate was moved to one side, so as to leave the roadway clear, the gate would be constantly liable to be blown or pushed around, so as to strike the horses or vehicles passing by. This slot I in the cross-beam extends from a little past the center of the cross-beam, over to or very near to one of the posts B, and serves as a guide not only for this tenon G, but for the projection O, which extends downward from the under side of the block D. This tenon on the block serves to prevent the block from turning when the gate is being opened or closed and to keep it always in the same relative position.

After the gate has been opened wide it is raised upward until the tenon on top of the post has entered the slot I and the block D has been raised out of its recess, when the gate can be slid sidewise toward the post B the full length of the slot, thus leaving the roadway clear for either very wide vehicles and teams, or so that two or more can pass each other through the frame.

When it is desired to close the gate it is moved sidewise until the block D has reached the recess E, and the lower pivot of the gate is allowed to drop in its hole or bearing, when the gate is again locked in position and is ready to be opened and closed at both ends, as in the first instance.

In order to lock the gate securely there is a latch, N, formed for each end of the gate. To one of these latches is fastened the lever P, which extends above the top of the gate, so that it can be readily operated by persons on horseback. From this lever to the latch on the opposite end of the gate is secured a connecting-rod, V, by means of which both latches can be operated at the same time and by the same movement.

Fastened to one side of the central post of the gate is a spring, Y, which forces the latch back in position as soon as the lever is released.

Having thus described my invention, I claim—

1. The pivotal post H, provided with the flange G upon its upper end, in combination with the cross-beam C, having the slot I, the flange G serving to prevent the gate from being raised upward from its lower pivot until the gate has been opened wide, and then, by catching in the slot I, prevents the gate from swinging around while moved to one side of the center of its frame, substantially as shown.

2. The combination of the pivotal post H of the gate, provided with the flange G, with the cross-beam C, having the slot I and recess E, and the flanged block D, placed on the upper end of the pivotal post H, for catching in the recess E and preventing a sidewise movement of the gate until the block has been raised upward, substantially as described.

In testimony that I claim the foregoing I have hereunto set my hand.

HENRY H. FRANKS.

Witnesses:
P. H. ODELL,
A. L. CLINKINBEARD.